United States Patent
Hofmann et al.

(10) Patent No.: US 9,523,848 B2
(45) Date of Patent: Dec. 20, 2016

(54) MICROMIRROR SYSTEM AND METHOD OF MANUFACTURING A MICROMIRROR SYSTEM

(71) Applicant: Fraunhofer-Gesellschaft zur Foerderung der Angewandten Forschung e.V., Munich (DE)

(72) Inventors: Ulrich Hofmann, Itzehoe (DE); Hans-Joachim Quenzer, Itzehoe (DE); Joachim Janes, Itzehoe (DE); Björn Jensen, Itzehoe (DE)

(73) Assignee: FRAUNHOFER-GESELLSCHAFT ZUR FOERDERUNG DER ANGEWANDTEN FORSCHUNG E. V., Munich (DE)

( * ) Notice: Subject to any disclaimer, the term of this patent is extended or adjusted under 35 U.S.C. 154(b) by 25 days.

(21) Appl. No.: 14/386,744

(22) PCT Filed: Mar. 20, 2013

(86) PCT No.: PCT/EP2013/055852
§ 371 (c)(1),
(2) Date: Sep. 19, 2014

(87) PCT Pub. No.: WO2013/139866
PCT Pub. Date: Sep. 26, 2013

(65) Prior Publication Data
US 2015/0049374 A1     Feb. 19, 2015

(30) Foreign Application Priority Data
Mar. 21, 2012   (DE) .................. 10 2012 005 546

(51) Int. Cl.
*G02B 26/08*   (2006.01)
*G02B 7/18*    (2006.01)
(Continued)

(52) U.S. Cl.
CPC ........... *G02B 26/0833* (2013.01); *B32B 37/16* (2013.01); *B32B 38/0008* (2013.01); *B32B 38/10* (2013.01);
(Continued)

(58) Field of Classification Search
CPC ................. B81C 1/00; B81C 1/00047; B81C 2203/0145; B81B 7/02; B81B 7/0061; B81B 7/0067; B81B 7/007; B81B 7/0038; B81B 7/0083; G02B 26/08; G02B 26/001; G02B 26/0841; G02B 26/0833; G02B 2006/12104; G02J 5/04
(Continued)

(56) References Cited

U.S. PATENT DOCUMENTS 6,633,693 B1   10/2003   Peale et al.
7,642,515 B2 *  1/2010   Tinnes ............... G01J 5/04
                                                    250/338.1
(Continued)

FOREIGN PATENT DOCUMENTS

DE   102007034652 A1   1/2009
DE   102008049556 A1   4/2010
(Continued)

OTHER PUBLICATIONS

International Search Report and Written Opinion issued in PCT/EP2013/055852, mailed Jun. 20, 2013, 10 pgs.

*Primary Examiner* — Euncha Cherry
(74) *Attorney, Agent, or Firm* — Faegre Baker Daniels LLP

(57) ABSTRACT

A micromirror system that includes a chip frame, at least one spring element, and at least one mirror plate oscillatorily suspended in the chip frame via the at least one spring element. The chip frame and the at least one spring element include at least one microchannel which is provided with an (Continued)

inlet opening and an outlet opening for leading through a flowing coolant.

10 Claims, 6 Drawing Sheets

(51) Int. Cl.
    *G02B 7/182*     (2006.01)
    *B32B 37/16*     (2006.01)
    *B32B 38/00*     (2006.01)
    *B32B 38/10*     (2006.01)
    *G02B 1/12*     (2006.01)

(52) U.S. Cl.
    CPC ............... *G02B 1/12* (2013.01); *G02B 7/1815* (2013.01); *G02B 7/1821* (2013.01); *B32B 2307/416* (2013.01); *B32B 2310/0875* (2013.01); *B32B 2551/08* (2013.01)

(58) Field of Classification Search
    USPC .......................... 359/198.1–226.1, 290, 291
    See application file for complete search history.

(56) References Cited

U.S. PATENT DOCUMENTS

2004/0147056 A1     7/2004   McKinnell et al.
2006/0119815 A1     6/2006   Franken et al.

FOREIGN PATENT DOCUMENTS

| DE | 102009054888 A1 | 6/2011 |
| EP | 1674913 A2 | 6/2006 |
| JP | 2004095993 A | 3/2004 |
| WO | 2009061578 A1 | 5/2009 |
| WO | 2010079133 A2 | 7/2010 |

\* cited by examiner

MICROMIRROR SYSTEM AND METHOD OF MANUFACTURING A MICROMIRROR SYSTEM

CROSS-REFERENCE TO RELATED APPLICATIONS

This application is a national phase application of PCT Application No. PCT/EP2013/055852, internationally filed Mar. 20, 2013, which claims priority to German Application No. 10 2012 005 546.3, filed Mar. 21, 2012, all of which are herein incorporated by reference in their entirety.

TECHNICAL FIELD

This disclosure relates to a micromirror system and to a method of manufacturing a micromirror system.

BACKGROUND

Micro-technologically manufactured beam deflection mirrors, so-called MEMS scanners, can be applied to a multitude of applications, such as laser projection displays, barcode scanners, microscopes, OCT endoscopes, LIDAR scanners, imaging spectrometers and others. The beam deflection mirrors which are designed as microactuators, for example, comprise an oscillation body which is designed as a mirror and which is suspended in a chip frame in an oscillatory manner via one or more spring elements. The chip frame thereby can be closed at one side, wherein the mirror plate and the spring elements are arranged in a cavity. The chip frame however can also be encapsulated on both sides with a glass cover.

Such micromirror systems or arrangements or beam deflection mirrors usually have very low moments of inertia which permit such miniaturised beam deflection systems to achieve very high scan speeds of up to 100 kHz. Adequately large deflection angles can be produced by way of an operation in resonance, despite very limited drive forces. This advantage is particularly useful in display technology.

However, there are applications, in which MEMS scanners or microactuators are not used and preference is given to conventionally manufactured galvanometer scanners.

SUMMARY

A micromirror system including a chip frame, at least one spring element, and at least one mirror plate oscillatorily suspended in the chip frame via the at least one spring element. The chip frame and the at least one spring element include at least one microchannel which is provided with an inlet opening and an outlet opening for leading through a flowing coolant.

While multiple embodiments are disclosed, still other embodiments will become apparent to those skilled in the art from the following detailed description, which shows and describes illustrative embodiments. Accordingly, the drawings and detailed description are to be regarded as illustrative in nature and not restrictive.

DETAILED DESCRIPTION

Figure 1:
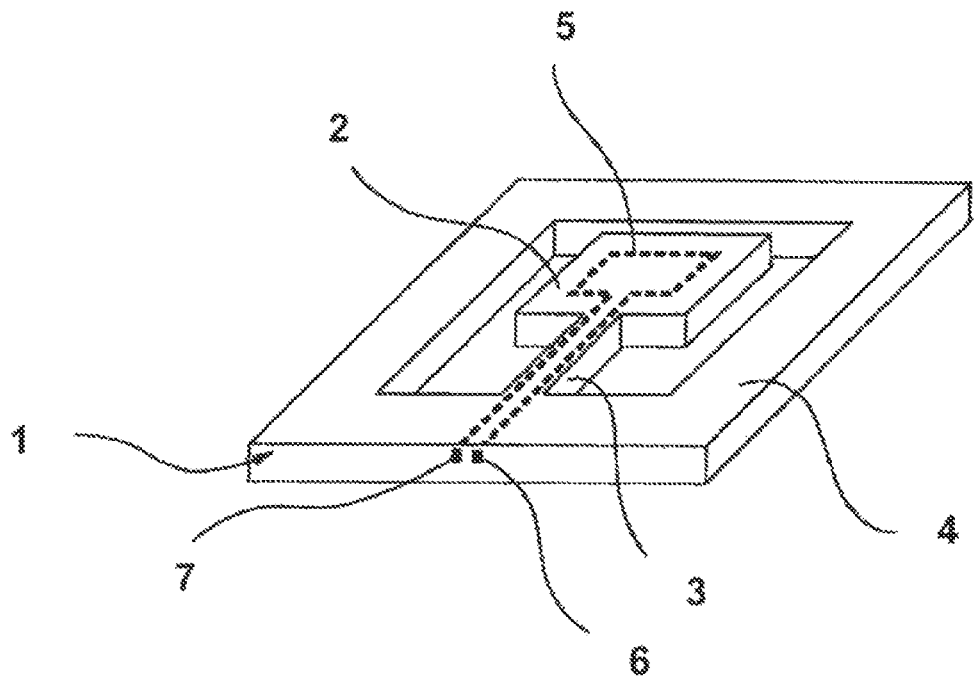
FIG. 1 is a diagram illustrating an embodiment example of a micromirror system or arrangement according to the disclosure, in a perspective view, with a mirror plate which is suspended at one side.

Until now, there were applications, in which MEMS scanners or microactuators could not be successfully applied. Instead, preference was given to conventionally manufactured galvanometer scanners. These applications include all vector scan applications, with which one must make do without resonant operation, and all applications in which laser powers above a few Watts must be handled by the beam reflection system. Until now it has not been the MEMS scanners, but conventional galvanometer scanners which have been applied. Finally, up to now, one had to fall back on galvanometer scanners in all applications, in which the laser beam to be scanned has a diameter above 5 mm.

These restrictions come down to one cause, which is micro-technologically manufactured beam deflection systems have forces which are many magnitudes smaller than those which are available in conventionally manufactured macroscopic scanners. This inevitably leads to the fact that the moments of inertia of MEMS scanners must be accordingly smaller, in order to achieve appreciable deflections and beam defections. Strict limits are therefore placed on the mirror diameter, the mirror thickness and the spring cross sections of MEMS mirrors. The low thermal capacity of MEMS scanners which results from this, and the low thermal power which can be dissipated to the surroundings via the thin spring cross sections until now have not permitted the applications of these MEMS mirrors in laser material machining, where laser powers of up to several kilowatts are often applied.

Even conventional mirrors must be coated with elaborate dielectric multilayer stacks, in order to achieve an as high as possible reflectivity of >99% and thus to keep the thermal loading of the mirror due to absorption as low as possible. These layer stacks produce high mechanical stress gradients which deform the mirror plate in an undesirable manner. The thinner the mirror, the greater is the deformation. MEMS mirrors typically have a ratio of mirror thickness to diameter of one to ten, i.e. if a mirror of several millimeters diameter were to be coated in the mentioned manner, it would have to have a mirror thickness of up to several tenths of a millimeter, which however due to the increased moments of inertia which this entails, necessitates drive forces which cannot be achieved in a MEMS component.

A mirror arrangement which comprises an optical element received in a chamber, and a substrate forming the chamber walls, and at least one transparent cover is known from DE 10 2007 034 652 A1. A medium for thermal dissipation is provided in the chamber and moreover the chamber walls are cooled, for example interspersed with cooling channels, through which a cooling gas or a cooling liquid is led, in order to lead away the heat of the surface of the optical element, said heat caused by the beamed-in light.

The present disclosure provides a micromirror system or arrangement with a mirror plate which is oscillatorily suspended via at least one spring element, with which the heat dissipation from the mirror plate is improved, in order to realise comparatively large diameters of the active mirror plate, to keep the dynamic and static deformations low, to achieve large scan amplitudes and to ensure a high tolerance with regard to heat input.

FIG. 1 is a diagram illustrating an embodiment example of a micromirror system or arrangement according to the disclosure and with a microactuator 1, wherein the microactuator comprises a mirror plate 2 which is suspended on a spring element 3 forming a spring suspension, in a rigid chip frame 4. A microchannel 5 is indicated in a dashed manner and extends from an inlet opening 6 which is arranged in the narrow side wall of the chip frame, through the limb of the chip frame 4, the spring element 3, in a peripheral loop in the mirror plate 2, back again through the spring element 3 and the limb of the chip frame 4 up to an outlet opening 7 which lies next to the inlet opening 6. The inlet opening and the outlet opening are each connected to a supply unit for coolant, said supply unit not being represented and being suitable for letting the coolant which can be gaseous, liquid or multiphase, flow through the hermetically sealed microchannel 5 with the help of a pressure drop, so that a temperature gradient between the mentioned parts—the mirror plate 2, spring element 3 and chip frame 4 and the through-flowing coolant can be utilised, in order to convectively dissipate heat. As already specified, with regard to the represented microactuator it is the case of a movable, oscillatory mirror for deflecting laser light.

The mirror plate 2 of the microactuator 1 in the known manner is deflected into oscillation by an electrostatic, electromagnetic, piezoelectric or thermomechanical drive.

Figure 2:
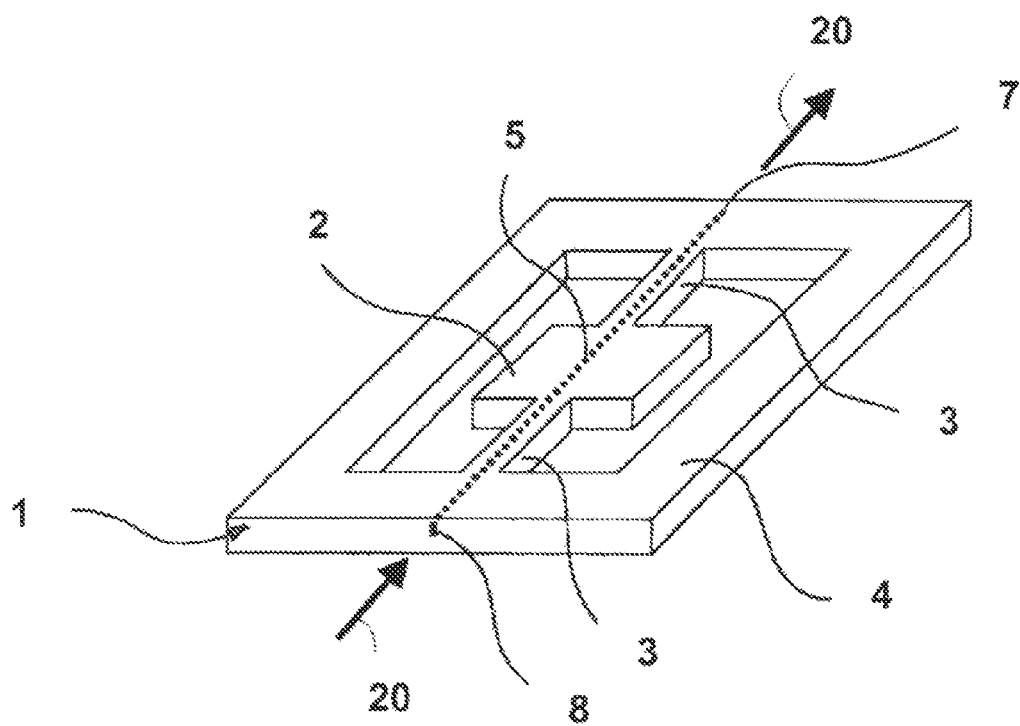
FIG. 2 is a diagram illustrating an embodiment example of a micromirror system or arrangement according to the disclosure, in a schematic perspective view with a single-axis mirror plate suspended at two sides.

A further embodiment example of a microactuator 1 is represented in FIG. 2, and this differs from that according to FIG. 1 in that the mirror plate 2 is suspended according to an oscillation axis in the inside of the rigid chip frame, on two spring elements 3 which are oppositely lying with respect to the mirror plate. The microchannel 5 here extends from a narrow side of the chip frame 4 in a straight line through a limb of the chip frame 4, the first spring element 3, the mirror plate 2, the second spring element and the opposite limb. The inlet opening 6 thereby lies at the one narrow side of the chip frame, and the outlet opening 7 lies at the oppositely lying narrow side of the chip frame 4, wherein the flow direction of the coolant is indicated by the arrows 20. The microchannel 5 in this embodiment example is designed in a straight-lined manner, but it can however also be arranged in one or more loops in the mirror plate 2, or also be branched.

Figure 3:
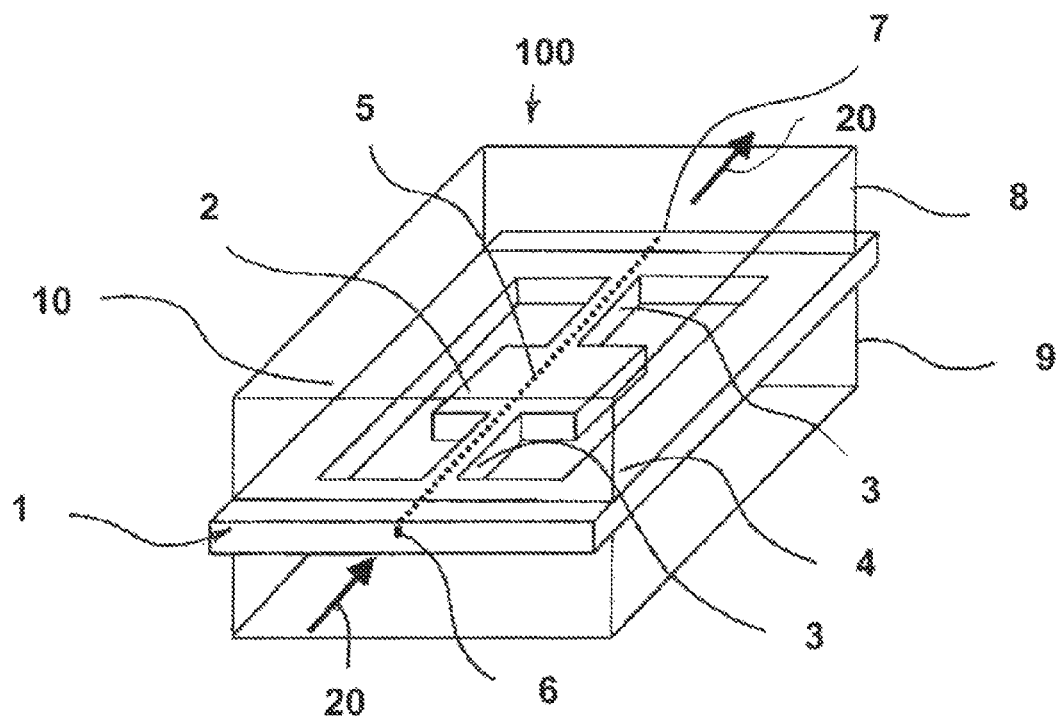
FIG. 3 is a diagram illustrating a micromirror system or arrangement according to FIG. 2, with an upper-side and with a lower-side cover.

A micromirror system or arrangement 100 is represented in FIG. 3, with which the microactuator 1 according to FIG. 2 is provided with two covers 8, 9, wherein the cover 8 is bonded onto the upper side of the chip frame, whilst the cover 9 is bonded onto the lower side of the chip frame 4.

The microactuator 1 is thus encapsulated in a cavity in an essentially complete manner. The bonding of the covers 8, 9 can thereby be carried out such that the microactuator 1 is sealed in a hermetically tight manner, wherein air or gas is enclosed in the cavity or can also be subjected to a vacuum, as is yet described later. The covers 8, 9 originate from a glass wafer, i.e. they are transparent to visible light and/or infrared light, but it is also conceivable for a non-transparent cover, e.g. of a silicon wafer which is provided with a cavity, to be connected to the chip frame 1.

Figure 4:
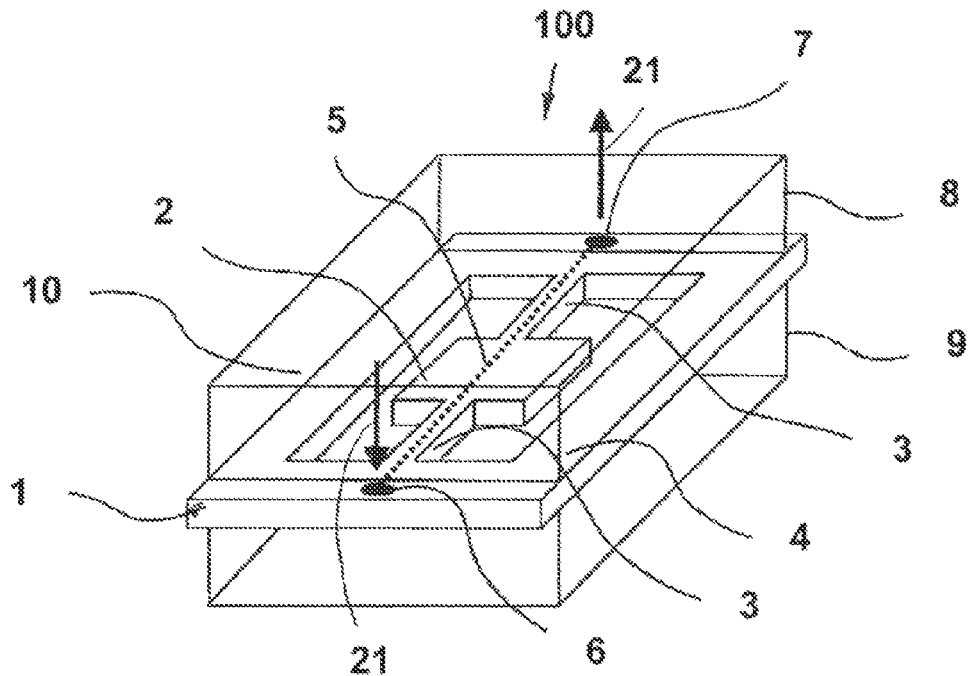
FIG. 4 is a diagram illustrating a micromirror system or arrangement according to FIG. 3, however with upper-side openings for an inlet and an outlet of a coolant.
Figure 5:
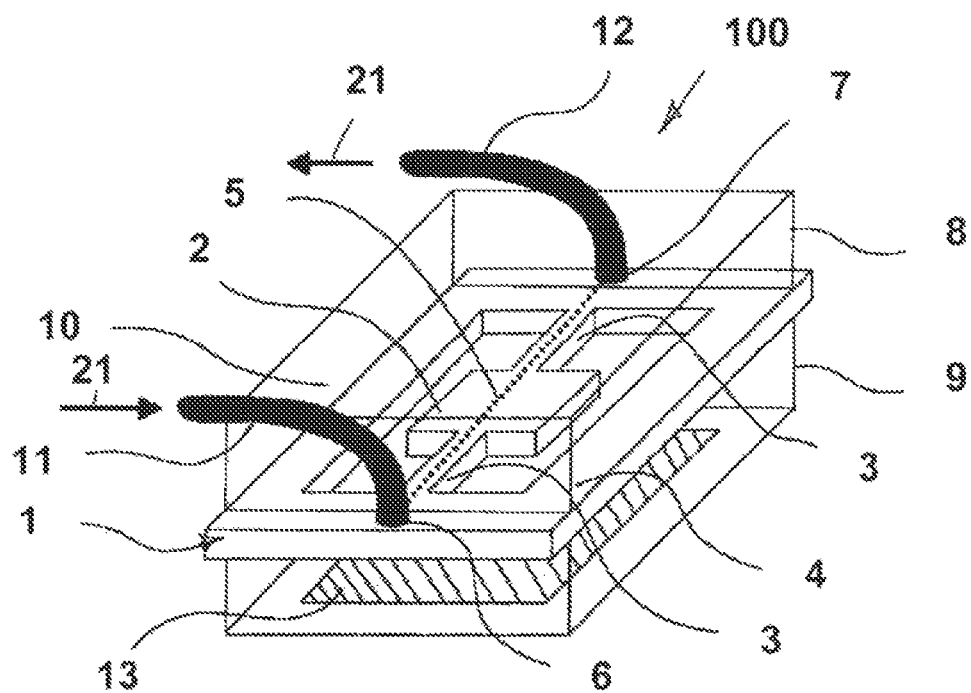
FIG. 5 is a diagram illustrating a view according to FIG. 4, with conduits leading the coolant and with a getter.

FIG. 4 is a diagram illustrating a micromirror system or arrangement 100 which differs from that according to FIG. 3 in that the inlet opening 6 and the outlet opening 7 are incorporated perpendicularly to the plane of the chip frame 4, on the upper side of the chip frame in the drawing. The inflow and outflow direction into and out of the microchannel 5 are thereby indicated by arrows 21. Such an embodiment simplifies the contacting-on of a media conduit, in particular if there is little available space. Such an embodiment of a micromirror arrangement 100 with a feed hose 11 contacted onto the inlet opening 6, and a discharge hose 12 contacted onto the outlet opening 7, for feeding and discharging the coolant, is represented in FIG. 5. Additionally, a getter 13 in the form of a metal layer, e.g. of titanium, is integrated in the cavity 10, by which means the microactuator 1 can be encapsulated in a vacuum environment. Thereby, the incorporated metal layer oxidises at a high temperature and thereby above all bonds $O_2$, and $N_2$, by which means these molecules no longer contribute to the gas pressure.

Figure 6:
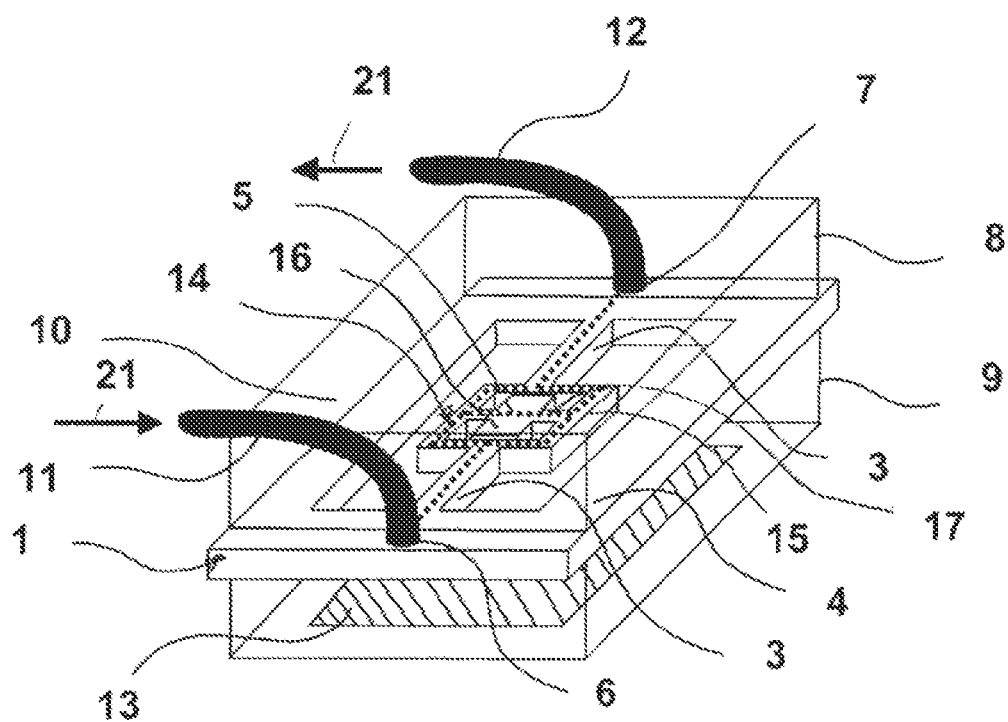
FIG. 6 is a diagram illustrating a view according to FIG. 5, with a mirror plate which oscillates in a two-axis manner and with a branched microchannel.
Figure 7:
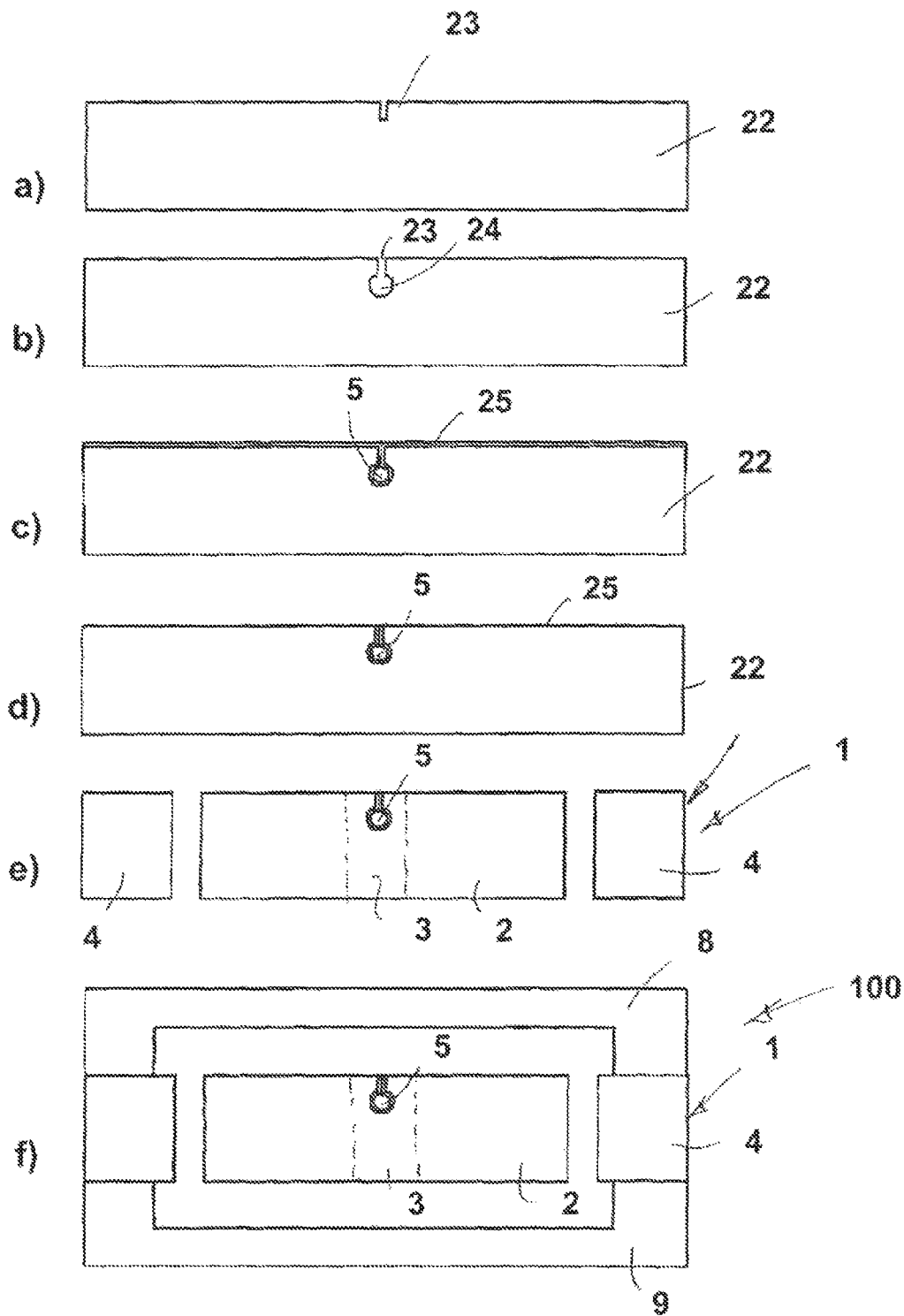
FIGS. 7a-f are diagrams illustrating different steps of a method for manufacturing a micromirror system or arrangement.

A further embodiment example of a micromirror system or arrangement 100 is represented in FIG. 6, wherein this differs from that according to FIG. 5 in that the mirror plate in this embodiment example is indicated at 16. An oscillation element 14 has an outer frame 15, and an inner oscillation element forming the mirror plate 16 is suspended on two spring elements 17 which are connected to the outer frame 15. A mirror plate 16 deflected about two oscillation axes is produced by way of this. Thus a mirror is provided, which can deflect incident laser light in two axes. The microchannel 5 in this embodiment example is led via the one spring element, branches according to the frame 15 of the oscillation element 14, and connects again, in order to get to the outlet opening 7 via the second spring element 3. Moreover, the microchannel 5 branches on the outer frame 1, in order to be led through the spring elements 17 and the mirror plate 16.

An embodiment example of a method for manufacturing a micromirror system or arrangement 100 or a microactuator 1, as described previously, is described in more detail by way of FIGS. 7a-f.

The starting step a) shows a silicon wafer 22, into which a groove 23 is incorporated by way of anisotropic plasma etching, said groove specifying the geometric course of the microchannel 5 according to the FIGS. 1 to 6. Then, according to b), an isotropic plasma etching step is applied, i.e. the applied etching agent works on all directions of the crystal grid, in order to produce the actual cavity 24 of the microchannel 5 below the surface of the silicon wafer, i.e. connecting to the groove 23. Then, according to c), a polysilicon layer is deposited in a conform manner, for example by way of high-temperature LPCVD deposition. Thereby, the groove, i.e. the narrow location leading to the cavity 24 is closed to the top, so that the microchannel 5 arises within the silicon wafer 22 without connection to the surface of this wafer, i.e. in a hermetically tight manner Optionally, a polishing step d) can be added, in order to reduce roughness on the surface of the deposited polysilicon layer 25. Subsequently, the actual microactuator 1 is structured from the silicon wafer 22, by which means the chip frame 4, the mirror plate 2 and the spring elements 3 are manufactured. Glass covers 8, 9 with deep cavities are bonded onto the silicon wafer 22 or onto the chip frame 4 which is manufactured therefrom, by which means the microactuator 1 is encapsulated in a cavity 10.

A multitude of micromirror arrangements are manufactured on a silicon wafer according to the steps a) to f), wherein a multitude of glass covers 8 is likewise arranged on a glass cover wafer. The wafer composite manufactured according to step f) is then singularised into the multitude of micromirror arrangements 100, wherein the microchannels 5 are released, i.e. the inlet openings and outlet openings are formed, on singularisation.

A further method is represented in the FIGS. 8a-d and FIGS. 9a-d, wherein FIGS. 8a-d differ with respect to FIGS. 9a-d only in the last step. In FIG. 8, as a starting step a), a silicon insulator wafer 26 as a starting material is provided, which is usually formed from a silicon layer, an insulator, i.e. a silicon dioxide and a further silicon layer. In step b) the wafer 26 is structured on both sides by way of anisotropic plasma etching, by which means the geometry of the microactuator 1 and the cross section of the microchannel 5 are defined. The thin insulator membrane is removed in a gaseous flow acid between step b) and step c). In step c) the glass cover wafer with deep cavities is bonded as a cover 8. Two such bonded glass wafers and silicon wafers which are represented according to step c) are bonded to one another with their lower sides in an adjusted manner such that the microchannel 5 is hermetically closed and the micromirror arrangement 100 with the microactuator 1, chip frame 4, mirror plate 2 and spring elements 3 is formed, in order in step d) to manufacture the actual micromirror arrangement with the microactuator. As already specified, here a multitude of micromirror arrangements 100 are also manufactured on a wafer with corresponding cover wafers and then singularised, wherein the channel 5 is rendered accessible in each case.

Figure 8:
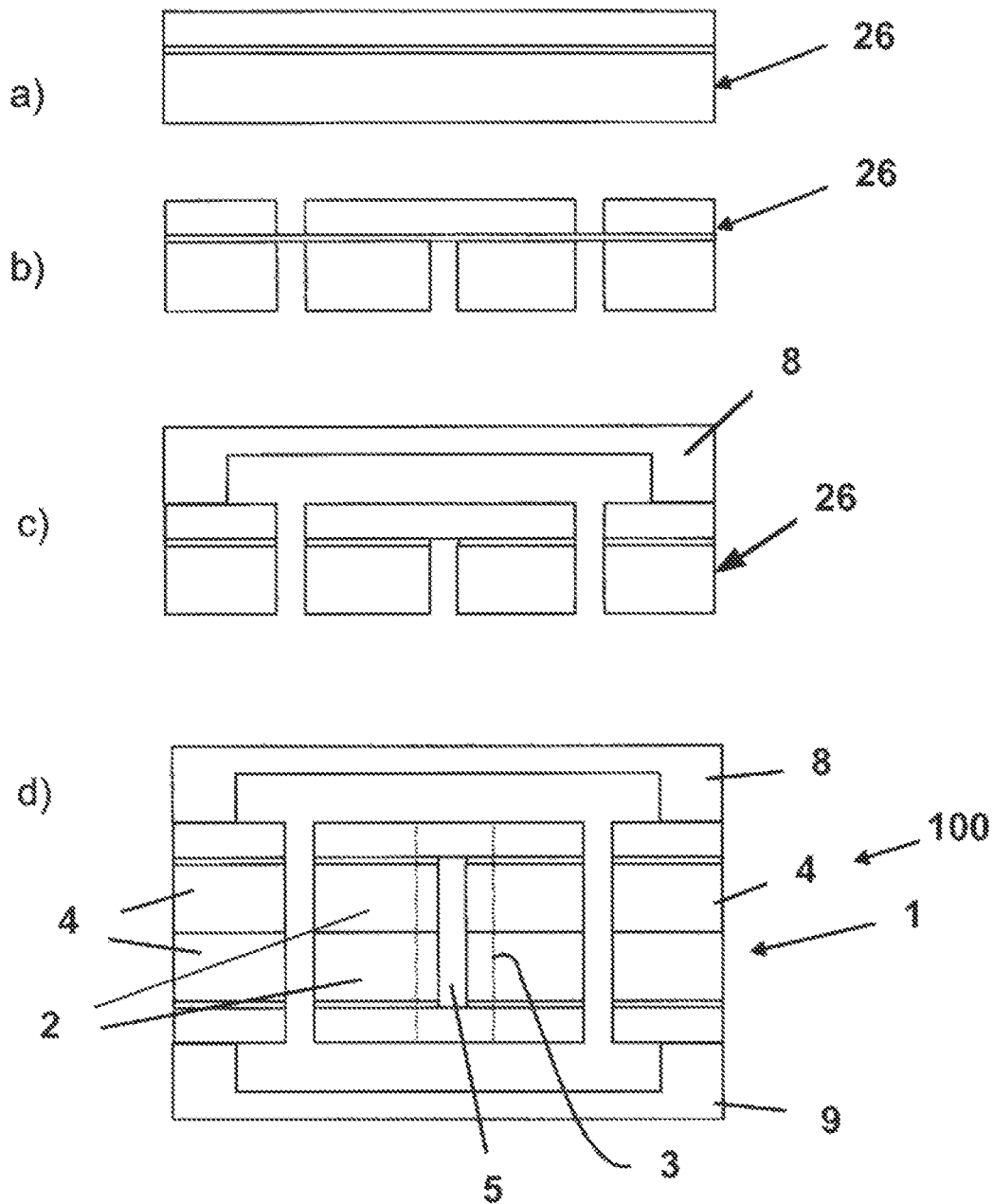
FIGS. 8a-d are diagrams illustrating different steps of a method for manufacturing a micromirror system or arrangement.
Figure 9:
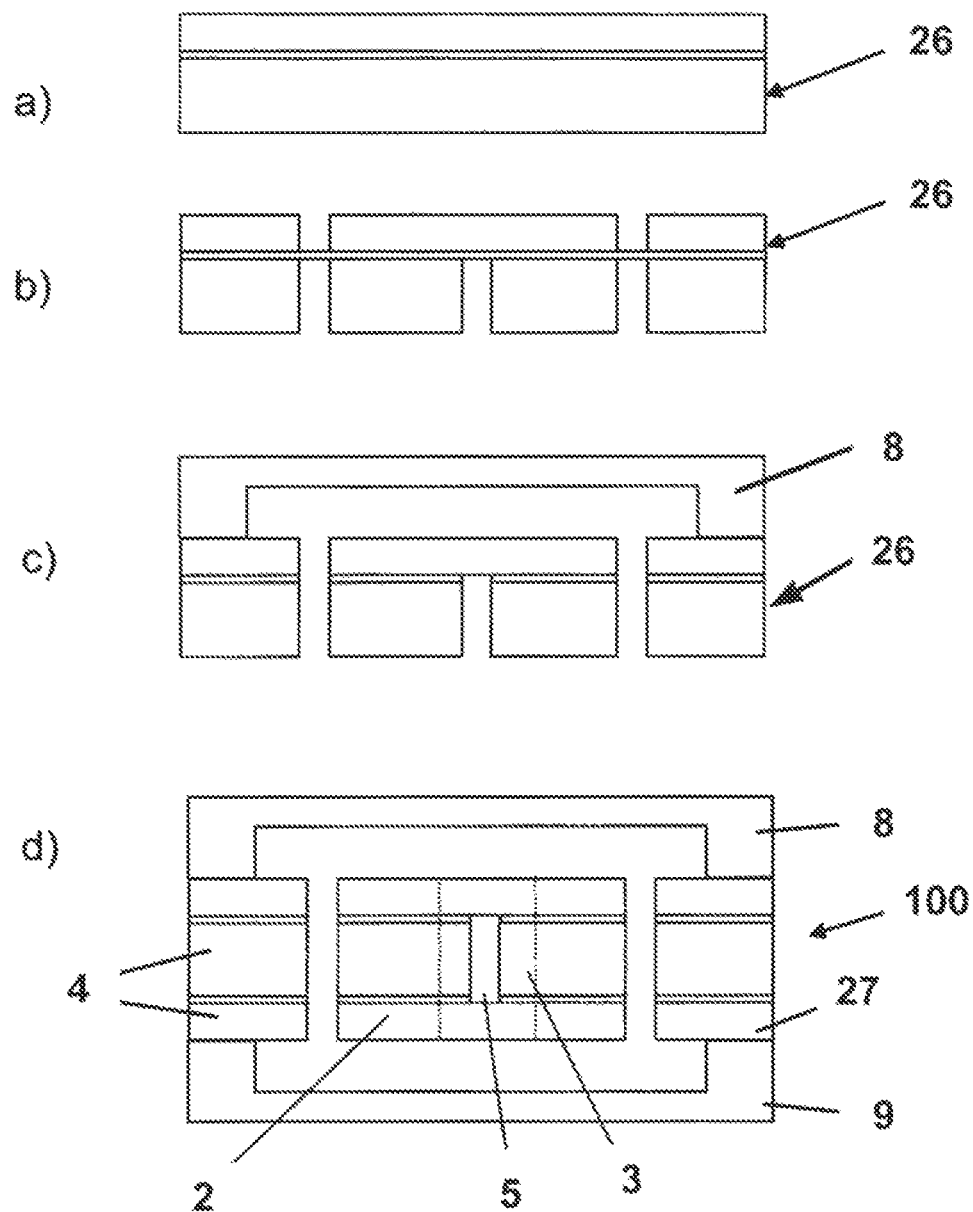
FIGS. 9a-d are diagrams illustrating different steps of a method for manufacturing a micromirror system or arrangement.

As specified, the steps a) to c) in FIG. 9 correspond to those of FIG. 8. However, in step d) a wafer composite of a further silicon wafer 27 which by way of anisotropic plasma etching is only provided with the microactuator geometries by structuring, without however transmitting a microchannel, and of a glass cover 9 which was bonded to the silicon wafer 27, is bonded to the wafer composite in an adjusted manner according to a) to c). Thereby, the microchannel 5 is hermetically closed off and a micromirror arrangement 100 formed. Just as in FIG. 8, a multitude of micromirror arrangements 100 is manufactured on a wafer and singularised, by which means again the respective microchannels 5 are released.

In the above description, different features were mentioned with different embodiment examples. Even if a feature was only described for one embodiment example, it can be applied to all other embodiment examples, so that micromirror systems or arrangements with different combinations of described features can be provided.

As described in the disclosure, with a micromirror system or arrangement with at least one mirror plate which is oscillatorily suspended in a chip frame via one or more spring elements, at least one microchannel provided with an inlet and an outlet opening and for leading through a flowing coolant, for example liquid or gas, is arranged in the chip frame and in the one or more spring elements or in both and additionally in the at least one mirror plate, it is possible to dissipate heat via the coolant led in the microchannel. Thereby, a gaseous or fluid or multiphase medium is used as a coolant, and this coolant can be led through the channel with the help of a pressure drop, such that a temperature gradient between the mentioned constituents, in particular the spring suspension and the mirror plate and the through-flowing medium can be utilised, in order to convectively dissipate the heat. A lateral dissipation of heat is realised, wherein the heat is transported via the springs to the surrounding substrate. Compressed air, helium, water and other fluid media which for example have a high thermal capacity can be used as a flowing coolant. It is also possible to realise MEMS mirrors for high light powers and to keep the dynamic and static mirror deformations low on account of the heat dissipation. Other fields of application can result by way of this, for example laser material machining and comparable high-power laser applications, which can then be realised with components of microtechnology. Many advantages with regard to manufacturing thereby result, and an inexpensive mass production is conceivable.

According to the disclosure, the inlet opening and the outlet opening are arranged on one side of the chip frame or on different sides of the chip frame, by which means different design possibilities result. For example, a mirror plate which is suspended on only one spring element can be realised, wherein the channel can be led back onto the same side of the chip frame in a loop-like manner, such as via the mirror plate. However, it is also possible to suspend the mirror plate on two opposite spring elements, by which means the microchannel can have its inlet opening on the one side of the chip frame and its outlet opening on the other side of the chip frame. Mirror plates suspended in a single-axis or multi-axis manner can also be realised.

In some embodiments, the inlet opening and the outlet opening of the at least one microchannel can be directed in the longitudinal direction of the part of the microchannel which connects to the respective opening, or in some embodiments the inlet opening and/or the outlet opening can run in a direction which is angled to the longitudinal direction at a non-negligible angle, such as at an angle of 90°. The design possibilities are also improved by way of these embodiments, and the coolant feed and discharge can be adapted to the surrounding conditions.

In some embodiments, the course of the at least one microchannel in the chip frame and/or the one or more spring elements and/or the at least one mirror plate can be designed in a loop-like or branched manner. The realised heat dissipation can be adapted to the expected heat input by way of this, so that the functional reliability of the micromirror arrangement is ensured.

In some embodiments, the chip frame on the upper side and/or lower side is connected to a cover provided with a cavity, in a manner such that at least a part of the chip frame, the one or more spring elements and the at least one mirror plate are encapsulated in a cavity. The microactuator which is designed as a mirror can be protected from contamination due to the fact that the encapsulation which can be implemented on the wafer level, is sealed, such as hermetically sealed. Moreover, the cavity can be subjected to a vacuum or be filled with air or another gas such as helium, by way of this. On the one hand, on account of the vacuum encapsulation, one succeeds in the flow of the flowing coolants not penetrating into the cavity or into the vacuum cavity, but only running in the microchannel. On the other hand, the viscous friction of the MEMS mirror can be significantly reduced by way of the vacuum encapsulation, by which means a very effective energy utilisation results for the commonly available electrostatic, electromagnetic, piezoelectric or thermomechanical drives, such as in the case of a resonant operation. In other applications, it can be useful to fill the cavity of the encapsulation with air or with another gas, such as helium, for further heat dissipation.

The inlet opening and the outlet opening are connected to a feed conduit and to a discharge conduit respectively, for feeding and discharging the medium flow, wherein the openings are arranged with the conduits on the chip frame outside the encapsulation, i.e. outside the cover.

The micromirror system or arrangement is designed for deflecting laser light, wherein the mirror plate can be suspended in a single-axis or multi-axis manner Very large and solid mirrors with diameters >5 mm can also be operated with comparatively large deflection angles due to the described arrangement of the mirrors in the vacuum.

The hermetically sealed microchannel on the inflow side, i.e. at the inlet opening can be provided with a narrowing, in order to obtain an additional cooling by way of the expansion of the coolant, such as gas.

The design, according to the disclosure, of the microactuator formed from the chip frame, the spring elements and at least one mirror plate permits the most varied of applications and designs.

The disclosure also relates to a method for manufacturing a micromirror system or arrangement, as is described above, with which the surface of a silicon wafer is structured according to the geometric course of the microchannel amid the application of an anisotropic plasma etching. A cavity is subsequently created below the incorporated structure by way of a isotropic plasma etching, and a silicon layer deposited (precipitated), by which means the structure is closed to the surface of the silicon wafer and a part of the cavity remains. Thereafter, the silicon wafer treated in such a manner, by way of etching, is structured into a microactuator with the spring element or elements and the at least one mirror plate, and encapsulated by way of connecting the silicon wafer to a cover comprising a cavity and/or to a further silicon wafer comprising a cavity and/or to a further cover having a cavity. The micromirror system or arrangement according to the disclosure and with an integrated microchannel can be realised relatively simply in this manner.

If, with the step of the closure of the channel at its narrow location by way of depositing (precipitating) a polysilicon layer, the surface of this layer should be too rough, then the layer can be polished in an intermediate step.

A further method for manufacturing a micromirror system or arrangement according to the disclosure envisages the etching of the structure of a microactuator with a chip frame, with the spring element or spring elements and with the at least one mirror plate, from one or both surfaces of a silicon wafer and the etching of the cross section of the microchannel from a surface of the silicon wafer up to a defined depth. For example, an SOI wafer (silicon insulation wafer) is used, which comprises an oxide stop layer, so that a respective etching process (plasma silicon etching process) comes to a halt as soon as the layer is reached. This has the advantage that the end result is homogeneous and defined with respect to the depth of the etching. Subsequently, a cover provided with a cavity is deposited onto the silicon wafer, and specifically onto the surface of the structured silicon wafer which lies opposite the surface, from which the microchannel was etched. The etched cross section of the microchannel is closed by way of bonding the silicon wafer manufactured by the preceding steps, to a further silicon wafer which is etched according to the structure of the microactuator. Plasma etching can be used for the etching, but another etching method, such as wet-chemical etching in TMAH or KOH can also be applied. A manufacturing possibility of a micromirror arrangement according to the disclosure can also be provided with this method.

The further silicon wafer is likewise manufactured with the steps of the structuring of the microactuator and of the etching of the cross section of the microchannel, with the previously mentioned method, and the two structured silicon wafers with their surfaces, from which the microchannel was etched, are bonded to one another such that the microchannel is closed off in a hermetically sealed manner. This simplifies the manufacturing method, since two equal silicon wafers can be connected to one another.

The cover or covers, with which the microactuator is encapsulated, is designed as a glass wafer which can be deposited onto the respective silicon wafer.

With the respective method according to the disclosure, a multitude of microactuators is manufactured on a wafer level, wherein the several covers are also designed as glass cover wafers, and the further silicon wafer, as the case may be, is structured according to the multitude of microactuator. After bonding the cover wafer, the MEMS wafer and the base wafer onto one another, the finished wafer composite is singularised (separated or diced) and the microchannels of the individual micromirror arrangements are rendered accessible. A plurality of micromirror arrangements can thus also be manufactured.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

The invention claimed is:

1. A micromirror system comprising:
a chip frame;
at least one spring element; and
at least one mirror plate oscillatorily suspended in the chip frame via the at least one spring element, wherein a hermetically sealed microchannel is disposed within at least one of the chip frame and the at least one spring element and the chip frame, the at least one spring element, and the at least one mirror plate, the hermetically sealed microchannel being provided with an inlet opening to receive a flowing coolant and an outlet opening to discharge the flowing coolant.

2. The micromirror system of claim 1, wherein the inlet opening and the outlet opening are situated on one of a side of the chip frame and different sides of the chip frame.

3. The micromirror system of claim 1, wherein at least one of the inlet opening and the outlet opening is directed in the longitudinal direction of a portion of the at least one microchannel which connects to the at least one of the inlet opening and the outlet opening.

4. The micromirror system of claim 1, wherein at least one of the inlet opening and the outlet opening is directed in a direction angled to the longitudinal direction of a portion of the at least one microchannel which connects to the at least one of the inlet opening and the outlet opening at an angle between 0 and 180 degrees.

5. The micromirror system of claim 1, wherein the at least one microchannel is loop shaped or branch shaped.

6. The micromirror system of claim 1, comprising a cover, wherein at least one of an upper side and a lower side of the chip frame is connected to the cover such that at least a part of the chip frame, the at least one spring element, and the at least one mirror plate are encapsulated in a cavity.

7. The micromirror system of claim 6, wherein the cavity is subjected to a vacuum and hermetically sealed.

8. The micromirror system of claim 6, wherein the cavity is filled with a gas and hermetically sealed.

9. The micromirror system of claim 6, wherein the cavity is filled with helium and hermetically sealed.

10. The micromirror system of claim 1, wherein the inlet opening is connected to a feed conduit for feeding the flowing coolant, and the outlet opening is connected to a discharge conduit for discharging the flowing coolant.

* * * * *